(12) United States Patent
Milicevic et al.

(10) Patent No.: US 8,443,630 B2
(45) Date of Patent: May 21, 2013

(54) INTERNAL VAPOUR DEPOSITION PROCESS

(75) Inventors: Igor Milicevic, Helmond (NL); Mattheus Jacobus Nicolaas Van Stralen, Tilburg (NL); Johannes Antoon Hartsuiker, Eindhoven (NL); Eugen Aldea, Eindhoven (NL); Eric Aloysius Kuijpers, Eindhoven (NL)

(73) Assignee: Draka Comteq, B.V. (NL)

( * ) Notice: Subject to any disclaimer, the term of this patent is extended or adjusted under 35 U.S.C. 154(b) by 75 days.

(21) Appl. No.: 13/082,080

(22) Filed: Apr. 7, 2011

(65) Prior Publication Data

US 2011/0247369 A1    Oct. 13, 2011

(30) Foreign Application Priority Data

Apr. 13, 2010  (NL) .................................. 2004546

(51) Int. Cl.
*C03B 37/018* (2006.01)
(52) U.S. Cl.
USPC .................... 65/417; 65/413; 65/391; 65/397
(58) Field of Classification Search
USPC ............... 65/391, 397; 64/391, 397, 413, 417
See application file for complete search history.

(56) References Cited

U.S. PATENT DOCUMENTS

| 4,493,721 A | 1/1985 | Auwerda et al. |
| 4,557,561 A * | 12/1985 | Schneider et al. ............ 385/124 |
| 4,714,589 A | 12/1987 | Auwerda et al. |
| 4,741,747 A | 5/1988 | Geittner et al. |
| 4,844,007 A | 7/1989 | Eikelboom |
| 4,877,938 A | 10/1989 | Rau et al. |
| 5,504,829 A | 4/1996 | Evans et al. |
| 7,930,903 B2 | 4/2011 | Hartsuiker et al. |
| 2003/0056549 A1* | 3/2003 | de Sandro et al. ............ 65/420 |
| 2003/0159781 A1 | 8/2003 | Van Stralen et al. |
| 2005/0000253 A1 | 1/2005 | Xie et al. |
| 2005/0041943 A1 | 2/2005 | Milicevic et al. |
| 2005/0081566 A1 | 4/2005 | Simons et al. |

(Continued)

FOREIGN PATENT DOCUMENTS

| JP | A-56-104735 | 8/1981 |
| JP | A-2000-327360 | 11/2000 |

(Continued)

OTHER PUBLICATIONS

Written Opinion dated Feb. 3, 2011 in Dutch Application No. 2004546.

*Primary Examiner* — Queenie Dehghan
(74) *Attorney, Agent, or Firm* — Shumaker, Loop & Kendrick, LLP

(57) ABSTRACT

A method for manufacturing a primary preform for optical fibers using an internal vapor deposition process, including the steps of: i) providing a hollow glass substrate tube having a supply side and a discharge side, ii) surrounding at least part of the hollow glass substrate tube by a furnace, iii) supplying a gas flow, doped or undoped, of glass-forming gases to the interior of the hollow glass substrate tube via the supply side thereof, iv) creating a reaction zone in which conditions such that deposition of glass will take place on the interior of the hollow glass tube are created, and v) moving the reaction zone back and forth in longitudinal direction over the hollow glass substrate tube between a reversal point located near the supply side and a reversal point located near the discharge side of the hollow glass substrate tube.

15 Claims, 2 Drawing Sheets

U.S. PATENT DOCUMENTS

| | | |
|---|---|---|
| 2005/0120751 A1 | 6/2005 | Simons et al. |
| 2005/0172902 A1 | 8/2005 | Van Stralen et al. |
| 2007/0289532 A1 | 12/2007 | Hartsuiker et al. |
| 2008/0044150 A1 | 2/2008 | Terpsma et al. |
| 2008/0063812 A1 | 3/2008 | Deckers et al. |
| 2009/0004404 A1 | 1/2009 | Hartsuiker et al. |
| 2010/0154479 A1 | 6/2010 | Milicevic et al. |
| 2011/0023549 A1 | 2/2011 | Hartsuiker et al. |
| 2011/0023550 A1 | 2/2011 | Hartsuiker et al. |

FOREIGN PATENT DOCUMENTS

| | | |
|---|---|---|
| NL | 1033769 C | 10/2008 |
| NL | 1037163 C | 2/2011 |
| NL | 1037164 C | 2/2011 |

* cited by examiner

INTERNAL VAPOUR DEPOSITION PROCESS

The present invention relates to a method for manufacturing a primary preform for optical fibres using an internal vapour deposition process, comprising the steps of:

i) providing a hollow glass substrate tube having a supply side and a discharge side, ii) surrounding at least part of the hollow glass substrate tube by a furnace, iii) supplying a gas flow, doped or undoped, of glass-forming gases to the interior of the hollow glass substrate tube via the supply side thereof, iv) creating a reaction zone in which conditions such that deposition of glass will take place on the interior of the hollow glass tube are created, and v) moving the reaction zone back and forth in longitudinal direction over the hollow glass substrate tube between a reversal point located near the supply side and a reversal point located near the discharge side of the hollow glass substrate tube.

The present invention further relates to a method for manufacturing a final preform for optical fibres.

The present invention further relates to a method for manufacturing an optical fibre.

Such a method is known per se from U.S. patent application US 2005/0000253. More in particular, said patent application discloses an internal vapour deposition process according to the PCVD technology, wherein a glass substrate tube is partially or completely surrounded by a resonant cavity along its cylindrical axis, and wherein a gas mixture comprising $O_2$, $SiCL_4$, $GeCl_4$ is supplied to the substrate tube. In said resonant cavity a local plasma is produced, causing a reaction between the components of the gas mixture inside the substrate tube, forming $SiO_x$ mainly doped with germanium. The resonant cavity moves back and forth along the cylindrical axis of the substrate tube, so that said tube is internally coated with glass layers. Said U.S. patent application further discloses the possibility to add freon ($C_2F_6$) to the gas mixture thus to reduce the formation of hydroxyl groups in the deposited glass.

JP 2000-327360 relates to a MCVD method for the manufacturing of a preform for optical fibres in which method the material gas flow in the quartz tube is increased, just before a heat source reaches a reversal point near the pump side, and in which the temperature of the heat source, when returning from the initial point of the substrate tube, is increased in order to heat the substrate tube only in the direction in which the gaseous compounds flow through the interior of the substrate tube.

US 2009/004404 relates to a method for manufacturing a preform for optical fibres in which the deposition process is interrupted by carrying out at least one intermediate step, wherein the intermediate step comprises supplying an etching gas to the supply side of the hollow substrate tube.

US 2005/081566 relates to a method for manufacturing a bar shaped preform for optical fibres in which method the amount of fluor compound that is supplied to the interior of the substrate tube is increased by a value of at least 10% at the end of the deposition, after which the substrate tube is subjected to a heat treatment such that diffusion of fluor from the deposited glass layers will occur.

JP 56-104735 relates to a method for manufacturing an optical fibre for infrared ray.

An optical fibre consists of a core and an outer layer surrounding said core, which outer layer is also referred to as "cladding".

The core may be made of one or more mutually different concentric layers, depending on the required optical properties of the optical fibre. At least part of the core usually has a higher refractive index than the cladding, so that light can be transported through the optical fibre, mainly through the core thereof.

For an optical fibre made of glass, the higher refractive index of the core can be obtained by doping the glass of the core with a refractive index-increasing dopant, such as germanium, for example. In the glass, germanium is mainly present as $GeO_2$. It is also possible to dope the core with a refractive index-increasing dopant as well as with a refractive index-decreasing dopant, in which case the relative proportions of said dopants are set so that the required refractive index is obtained. In particular fluorine is used as a refractive index-decreasing dopant.

During the transport of light through the optical fibre, several factors cause the signal strength (optical capacity) to decrease. Said decrease is referred to as "attenuation" and can expressed in a attenuation coefficient dB/km.

A first cause of attenuation is so-called Rayleigh scattering, which depends in particular on the amount and the type of dopants in the core of the optical fibre. Because of said Rayleigh scattering, a light signal being transported through an optical fibre comprising a relatively high amount of germanium dopant in the core will be attenuated more strongly than a light signal being transported through an optical fibre comprising a relatively low amount of germanium dopant.

The degree to which Rayleigh scattering takes place furthermore depends on the wavelength. More in particular, the degree of Rayleigh scattering is proportional to $\lambda^{-4}$, wherein $\lambda$ is the wavelength. Rayleigh scattering caused by germanium doping is several times stronger than Rayleigh scattering caused by fluorine doping.

A second cause of attenuation is the presence of impurities in the glass, which impurities absorb light at one or more specific wavelengths. In particular the presence of hydroxyl groups, mainly present as SiOH or GeOH in the optical fibre, is important, because at least one absorption wavelength is within the wavelength range in which optical fibres, in particular single mode optical fibres, are used. More in particular, an absorption peak is observed at a wavelength of about 1385 nm. Said absorption peak is also referred to as water peak or water attenuation.

The maximum length over which an optical signal can be transported by an optical fibre without being amplified depends on and is limited by, among other factors, the degree to which the optical signal is attenuated.

Consequently there is a need for optical fibres in which the amount of impurities, in particular hydroxyl groups, is minimised.

Furthermore there is a need for optical fibres in which the attenuation caused by Rayleigh scattering is minimised.

It is an object of the present invention to provide a method for manufacturing a primary preform for optical fibres, using an internal vapour deposition process, in which it is possible to influence the amount of hydroxyl groups that is incorporated during the internal vapour deposition process.

Another object of the present invention is to provide a method for manufacturing a primary preform for optical fibres, using an internal vapour deposition process, wherein the optical fibre manufactured on the basis of the primary preform has less attenuation at a wavelength of 1385 nm, and wherein the Rayleigh scattering is not adversely affected.

Yet another object of the present invention is to provide a method for manufacturing a primary preform for optical fibres, using an internal vapour deposition process, wherein the optical fibre manufactured on the basis of the primary preform has less Rayleigh attenuation and wherein the attenuation at a wavelength of 1385 nm is not adversely affected.

The present invention as described in the introduction is characterised in that during at least part of step v) an additional amount of a gas comprising a fluorine-containing compound is supplied to the interior of the hollow glass substrate tube via the supply side thereof when the reaction zone is located near or at a reversal point.

According to the present invention, an additional amount of a gas comprising a fluorine-containing compound is thus supplied during at least part of step v) when the reaction zone is located near or at the reversal point on the supply side or near or at the reversal point on the discharge side.

The present invention also provides an embodiment in which the additional amount of gas is supplied when the reaction zone is located near or at either one of the two reversal points during the deposition process, which means that an additional amount of gas is supplied both on the supply side and on the discharge side during a back and forth movement of the reaction zone.

It is noted that the reaction zone can at no time be located near or at both reversal points at the same time.

The phrase "additional amount of gas comprising a fluorine-containing compound" is understood to mean an extra or increased amount in comparison with the gas flow, doped or undoped, that is supplied during the movement of the reaction zone between the two reversal points. It is noted in this regard that the gas flow, doped or undoped, that is supplied during the movement of the reaction zone between the two reversal points may optionally comprise a basic amount of fluorine-containing compound. In the present invention the inventors have thus realised that the position of the reaction zone and the amount of fluorine-containing compound are of relevance in the deposition process. More in particular, the position of the reaction zone at the two reversal points, which reversal points are both reached by the reaction zone during 1 stroke, plays an important part, and it is precisely the combination reversal point/reaction zone that requires an additional amount of gas comprising a fluorine-containing compound, which additional amount of gas is to be supplied "on top of" the amount of fluorine-containing compound that may already be present. The present invention does not relate to maintaining a constant amount of fluorine-containing compound during a stroke of the reaction zone, in which a stroke is to be regarded as the movement of the reaction zone between the two points of reversal. It is preferred that the power of the reaction zone is constant during the movement of the reaction zone between these two points of reversal. The additional amount of gas, comprising a fluorine containing compound according to the present invention relates thus to the amount of fluorine containing compound that will be added additionally, and should not be misunderstood with an embodiment in which all the gaseous glass forming compounds are increased at once, i.e. the gaseous compounds to be supplied to the hollow substrate tube.

The reaction zone has a specific deposition width, seen in the longitudinal direction of the hollow glass substrate tube, which deposition width is preferably at least 2 times, preferably at least 3 times, preferably at least 4 times smaller than the distance between the two reversal points. As an example of a stroke length, i.e. the length of a stroke of the reaction zone between the two reversal points, a length of about 1.3 m can be mentioned. An example of a deposition width is a value in the range of from 35-10 cm, for example 30-15 cm.

The reaction zone is said to be located near a reversal point if the shortest distance between the reaction zone and the reversal point is less than 10%, preferably less than 5%, preferably less than 1% of the distance between the two reversal points.

The reaction zone is said to be located at a reversal point if the position of the reaction zone corresponds to the position at which the direction of movement of the reaction zone is reversed. When the reaction zone is located at a reversal point, the distance between the reaction zone and the reversal point is practically zero. In addition, the speed of the reaction zone practically equals zero at the reversal point.

The present inventors have surprisingly found that the supplying of an additional amount of fluorine-containing compound to the hollow glass substrate tube when the reaction zone is located near or at a reversal point will result in a decrease of the amount of incorporated hydroxyl groups in the deposited glass.

In addition, the present inventors have surprisingly concluded that the supplying of an additional amount of fluorine-containing compound in this manner does not affect the refractive index of the glass, more in particular of the glass layers that are deposited on the interior of the hollow glass substrate tube. A slightly increased amount of fluorine dopant was observed only near the reversal points.

These observations have led to the perception that the present invention makes it possible to reduce a basic amount of fluorine-containing compound that is supplied via the gas flow on the supply side of the hollow glass substrate tube during the internal vapour deposition process in comparison with the amount of fluorine-containing compound that is constantly being supplied, as a function of the deposition process, in a prior art vapour deposition process, without the aforesaid reduction having an adverse effect on the amount of hydroxyl groups in the thus deposited glass, more in particular the deposited glass layers.

The direct result of using a reduced basic amount of fluorine-containing compound is that a reduced amount of fluorine is incorporated in the deposited glass as a dopant. This makes it possible to reduce the amount of refractive index-increasing dopant, such as germanium, that is needed to obtain a required refractive index. The result of this is that the Rayleigh scattering, and thus the attenuation of an optical signal in the optical fibre, is significantly reduced.

In addition, these conclusions have led to the perception that the present invention makes it possible, given a constant basic amount of fluorine-containing compound being supplied via the gas flow on the supply side of the hollow glass substrate tube during the internal vapour deposition process, to reduce the total amount of hydroxyl groups in the deposited glass, more in particular in the deposited glass layers, without this having an adverse effect on the attenuation of an optical signal in an optical fibre caused by Rayleigh scattering. The present inventors have thus realised that it is possible, given a constant Rayleigh scattering, to reduce the attenuation at a wavelength of 1385 nm.

Finally, these conclusions have led to the perception that the present invention makes it possible, also in the absence of a basic amount of fluorine-containing compound being supplied via the gas flow on the supply side of the hollow glass substrate tube during the internal vapour deposition process, to reduce the total amount of hydroxyl groups in the deposited glass without this having an adverse effect on the attenuation of an optical signal in an optical fibre caused by Rayleigh scattering. The present inventors have thus realised that it is possible, given a constant Rayleigh scattering, to reduce the attenuation at a wavelength of 1385 nm in comparison with a prior art process.

Thus one or more of the above objects are accomplished by implementing the invention.

In a preferred embodiment, the fluorine-containing compound is free of hydrogen atoms and is preferably selected from the group consisting of the compounds $CF_4$, $C_2F_6$, $C_4F_8$, $CCl_2F_2$, $SiF_4$, $Si_2F_6$, $SF_6$, $NF_3$, $F_2$ or a mixture of two or more of these compounds. Preferably, the fluorine-containing compound is $C_2F_6$ or $C_4F_8$ or a mixture thereof.

In another preferred embodiment, the additional amount of gas is added in the form of one or more pulses, preferably using a pulse time of 10-500 ms, preferably 50-200 ms.

The total amount of fluorine-containing compound in the additional amount of supplied gas is 0.010-10.0 sccm, preferably 0.050-5.0 sccm, more preferably 0.1-1 sccm, wherein sccm stands for standard cubic centimeter at a pressure of 1 atmosphere and a temperature of 0° C.

In another preferred embodiment, the additional amount of gas that is supplied comprises a carrier gas and/or dopants and/or glass-forming gases. Preferably, oxygen is used as the carrier gas.

Preferably, the gas flow comprises at least one dopant selected from the group consisting of germanium, nitrogen, boron, titanium, phosphorus and aluminium in addition to a basic amount of fluorine-containing compound. When incorporated in the glass, said dopant increase the refractive index of the glass. Consequently, the refractive index-decreasing effect of fluorine can be offset by the presence of one or more of the above refractive index-increasing dopants.

Germanium will mainly be present as $GeO_2$ in the deposited glass. The germanium dopant can be added to the gas flow in the form of $GeCl_4$, for example.

Nitrogen will mainly be present as SiO—N in the deposited glass. The nitrogen dopant can be added to the gas flow in the form of $N_2$.

Titanium will mainly be present as $TiO_2$ in the deposited glass. The titanium dopant can be added to the gas flow in the form of $TiCl_4$.

Phosphorus will mainly be present as $P_2O_3$ in the deposited glass. The phosphorus dopant can be added to the gas flow in the form of $POCl_3$.

Aluminium will mainly be present as $Al_2O_3$ in the deposited glass. The aluminium dopant can be added to the gas flow in the form of $AlCl_3$.

Preferably, the internal vapour deposition process according to the present invention is of the PCVD type.

In a specific embodiment, the reaction zone in step iv) is a plasma, preferably a microwave plasma.

In another embodiment, the reaction zone moves at a speed of 10-40 meters per minute (m/min), preferably 15-25 meters per minute, especially 15-30 m/min in step v).

In another specific embodiment, the furnace is set at a temperature of 800-1200° C., preferably 900-1100° C., in step v).

In another specific embodiment, the furnace comprises one or more temperature zones, which can be set at different temperatures, possibly independently of each other. In addition, the temperature in one or more temperature zones may vary during the internal vapour deposition process.

An internal vapour deposition process of the PCVD type, in which the furnace comprising several temperature zones is used, is described in Dutch patent application No. 1037163, which was not open to public inspection yet at the time of the filing of the present application.

An internal vapour deposition process of the PCVD type, in which the temperature of the furnace is varied during the deposition process, is described in Dutch patent application No. 1037164, which was not open to public inspection yet at the time of the filing of the present application.

The methods according to the aforesaid two Dutch patent applications are specifically incorporated herein by reference.

In a special embodiment, the additional amount of gas is added only when the reaction zone is located at or near the reversal point near the supply side of the hollow glass substrate tube. The power of the reaction zone, especially the plasma power, is constant during the movement of the reaction zone over the length of the substrate tube. The deposition of glass layers takes thus place over the section gas side-pump side and pump side-gas side.

In another special embodiment, the additional amount of gas is added only when the reaction zone is located at or near the reversal point near the discharge side of the hollow glass substrate tube. The power of the reaction zone, especially the plasma power, is constant during the movement of the reaction zone over the length of the substrate tube. The deposition of glass layers takes thus place over the section gas side-pump side and pump side-gas side.

The present invention further relates to a method for manufacturing a final preform for optical fibres, comprising the steps of:

i) manufacturing a primary preform according to the present invention, and subsequently ii) collapsing the primary preform obtained in step i) into a solid primary preform, using a heat source, iii) optionally depositing an additional amount of glass on the exterior of the solid primary preform so as to form the final preform.

The present invention further relates to a method for manufacturing an optical fibre, comprising the manufacturing of the final preform, which method comprises the following steps:

i) manufacturing a primary preform according to the present invention, and subsequently ii) collapsing the primary preform obtained in step i) into a solid primary preform, using a heat source, iii) optionally applying an additional amount of glass to the exterior of the solid primary preform so as to form the final preform, and subsequently iv) heating one end of the final preform obtained in step iii) and drawing the optical fibre from the final preform.

The present invention will now be explained in more detail with reference to an example and a number of figures, in which connection it should be noted, however, that the present invention is by no means limited thereto.

Figure 1:
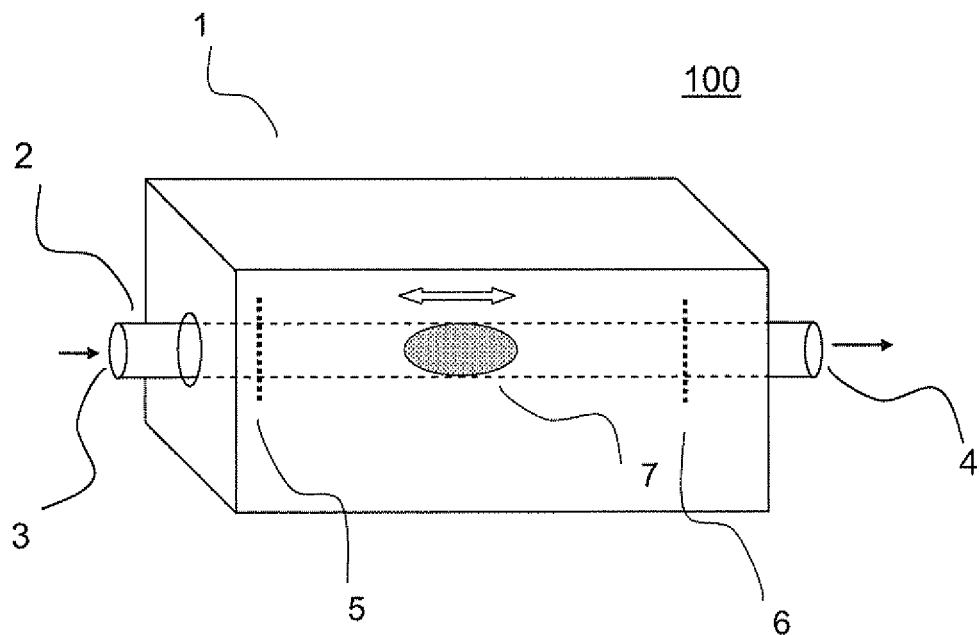
FIG. 1 is a schematic representation of a device for carrying out an internal vapour deposition process.

FIG. 1 schematically shows a device 100 for carrying out an internal vapour deposition process for manufacturing a primary preform for optical fibres. The device 100 comprises a furnace 1, which surrounds at least part of a hollow glass substrate tube 2. The hollow glass substrate tube 2 has a supply side 3 and a discharge side 4. The supply side 3 and the discharge side 4 can be positioned between a gas inlet and a gas outlet, respectively (not shown). The supply side 3 and the discharge side 4 may be clamped in a cylindrical passage provided with an O-ring seal, so that the internal volume of the hollow glass substrate tube 2 is isolated from the outside atmosphere. Such a construction makes it possible to carry out an internal vapour deposition process at a reduced pressure when a pump (not shown) is connected to the gas outlet.

FIG. 1 furthermore schematically shows a reaction zone 7, which reaction zone 7 moves back and forth during the internal vapour deposition process between a reversal point 5 located near the supply side 3 and a reversal point 6 located near the discharge side 4. The distance between the two reversal points is the stroke length, i.e. the length along which glass layers are deposited on the interior of the hollow glass substrate tube 2. The two reversal points are surrounded by a furnace 1.

During the internal vapour deposition process, doped or undoped glass-forming gases are supplied via the supply side 3 of the hollow glass substrate tube 2, which said glass-forming gases are converted into glass in the reaction zone 7. Making use of the back and forth movement of the reaction zone 7 between the reversal points 5, and 6, a number of glass layers are thus deposited on the interior of the hollow glass substrate tube 2.

The present invention is in particular suitable for an internal vapour deposition process of the PCVD type, in which microwaves are coupled into the interior of the hollow glass substrate tube 2, so as to form a local plasma, via a resonance cavity (also called resonator) which partially surrounds the hollow glass substrate tube 2, seen in the longitudinal direction thereof. The phrase "local plasma" is understood to mean a plasma having a length which more or less corresponds to the length of the resonator, both seen in the longitudinal direction of the hollow glass substrate tube 2. The resonance cavity is moved back and forth along the length of the hollow glass substrate tube between the two reversal points in a PCVD process.

A PCVD process is known in the art, for example from U.S. patent applications Nos. 2005/0000253, US 200810044150, US 2005/0120751, US 2008/0063812, US 2005/0041943 and U.S. Pat. No. 4,741,747 and U.S. Pat. No. 4,493,721.

Resonators are known in the art, for example from U.S. patent applications published under Nos. US 2007/0289532, US 2003/0159781 and US 2005/0172902, and U.S. Pat. No. 4,844,007, U.S. Pat. No. 4,714,589 and U.S. Pat. No. 4,877, 938. The PCVD process is a so-called low-pressure process, which means that the pressure is set at a value of 1-40 mbar, preferably 5-30 mbar, during the internal vapour deposition process.

Figure 2:
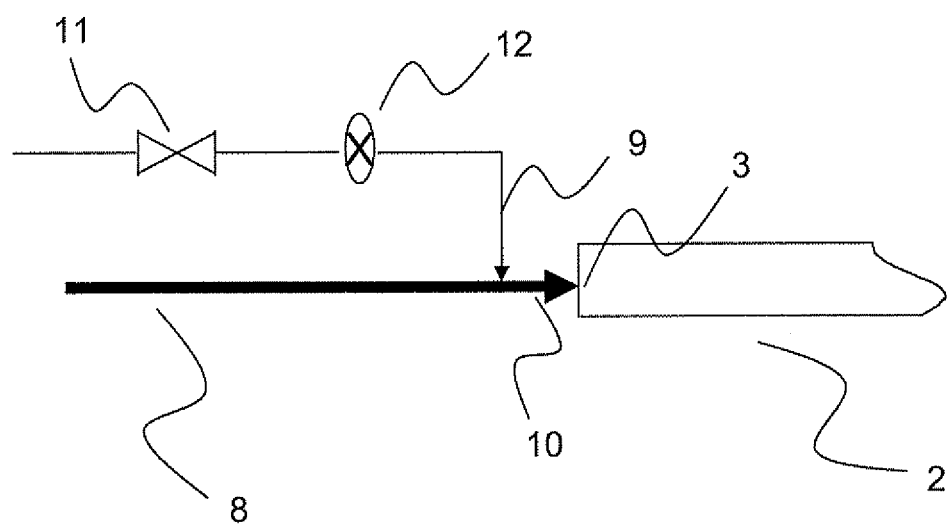
FIG. 2 is a schematic representation of a device suitable for carrying out the present invention

FIG. 2 shows a preferred embodiment of a device by means of which the present invention can be implemented. A gas flow 10 being supplied on the supply side 3 of the hollow glass substrate tube 2 is a combination of a main gas flow 8 and a subsidiary glass flow 9. The main gas flow 8 comprises the doped or undoped glass-forming gases and an optional basic amount of fluorine-containing compound. The additional amount of gas comprising a fluorine-containing compound is supplied via the subsidiary gas flow 9. The valve 11 is preferably a binary valve, which is a valve which only has an "open" and a "closed" position. In an internal vapour deposition process according to the invention, the valve 11 is switched to the "open" position as soon as the reaction zone 7 is located near or at a reversal point 5, 6. Thus, an additional amount of gas will at that moment be supplied on the supply side of the hollow glass substrate tube. Reaction zone 7 will subsequently return to reversal point 5, 6, which movement will be repeated several times. The power of the reaction zone 7 is during the back and forth movement of reaction zone 7 constant. By adjusting the gas pressure behind the valve 11, seen in upstream direction, and the size of the passage 12, the flow of additional gas can be precisely controlled. The amount of additional gas can thus be precisely set by adjusting the time during which the valve 11 is open. Such an embodiment clearly demonstrates that the flow of the subsidiary gas flow 9 is increased while maintaining a constant main gas flow 8.

In FIG. 2, the valve 11 and the passage 12 are shown some distance apart. It is preferable to dispose the valve 11 and the passage 12 as close together as possible or to integrate them together.

Preferably, the volume of the conduit through which the subsidiary gas flow 9 is transported between the valve 11 and the supply side 3 of the hollow glass substrate tube 2 is as small as possible.

In one embodiment, a conduit having a length of at most 1.0 m and a diameter of ¼ inch, corresponding to 6.35 mm, is used. The subsidiary gas flow 9 is preferably added to the main gas flow 8 at a location as close to the supply side 3 as possible. It is also possible to supply the subsidiary gas flow 9 directly to the supply side 3.

A system comprising binary valves which is suitable for carrying out the method according to the present invention is described in U.S. patent application No. 2010/154479, which was not open to public inspection yet at the time of the filing of the present application.

COMPARATIVE EXAMPLE 1

Five primary preforms for gradient index multimode optical fibres were produced, using a prior art PCVD-type internal vapour deposition process, by means of the device shown in FIGS. 1 and 2, with no gas being supplied via the subsidiary gas flow 9.

During the internal vapour deposition process, a constant basic amount (i.e. a constant flow) of fluorine-containing compound was added via the main gas flow 8. The amount of germanium dopant, present as $GeCl_4$ in the main gas flow, was gradually adjusted during the internal vapour deposition process so as to obtain the required gradient index radial refractive index profile.

After completion of the internal vapour deposition process, each of the five hollow glass substrate tubes and the glass layers deposited therein (primary preforms) was collapsed into a solid primary preform, using a heat source. Using a preform analyser, the radial refractive index profile was measured at a few positions around the middle, seen in longitudinal direction, of each solid primary preform. The term "radial refractive index profile" is to be understood to mean a representation of the refractive index as a function of the radial position in the primary preform.

Subsequently, an additional layer of glass was deposited on the solid primary preform, using a plasma overcladding technique, in which natural silica powder was deposited on the exterior of the primary preform and vitrified, using a plasma burner.

Following that, a gradient index multimode optical fibre was drawn from each final preform thus obtained.

The fibre thus drawn, which had a total length of about 200 km, was divided into a number of smaller parts and the attenuation (expressed in the attenuation coefficient) at a wavelength of 1385 nm of each of said parts was determined.

EXAMPLE 1

Three primary preforms for gradient index multimode optical fibres were produced, using the device according to the present invention. The conditions and process settings were the same as the settings and conditions used in Comparative Example 1, with this difference that during the manufacture of the three primary preforms according to Example 1 a pulsed additional amount of gas consisting of fluorine-containing compound $C_2F_6$ was added to the main gas flow 8 via the subsidiary gas flow 9 when the reaction zone was located at the reversal point near the discharge side. The pulse time was 120 ms and the total amount of additional $C_2F_6$ was 0.12 scc.

After completion of the internal vapour deposition process, each of the three hollow glass substrate tubes and the glass layers deposited therein (primary preforms) was collapsed into a solid primary preform, using a heat source. Using a preform analyser, the radial refractive index profile was measured at a few positions around the middle, seen in longitudinal direction, of each solid primary preform.

Subsequently, an additional layer of glass was deposited on the solid primary preform, using a plasma overcladding technique, in which natural silica powder was deposited on the exterior of the primary preform and vitrified, using a plasma burner.

Subsequently, a gradient index multimode optical fibre was drawn from each final preform thus obtained. The fibre thus drawn, which had a total length of about 200 km, was divided into a number of smaller optical fibre parts, and the attenuation (expressed in the attenuation coefficient) at a wavelength of 1385 nm of each of said parts was determined.

The primary preforms according to Comparative Example 1 and Example 1 were produced in turns, so that measurements carried out on the optical fibres from the various primary preforms, in particular the measurements of the attenuation at 1385 nm, could be readily compared with each other.

The present inventors did not observe a difference in the radial refractive index profile between primary preforms manufactured according to Comparative Example 1 and primary preforms manufactured according to Example 1. The present inventors conclude from this that no additional fluorine, or at least a negligible amount thereof, is incorporated in the deposited glass as a dopant when using the present invention according to Example 1.

Figure 3:
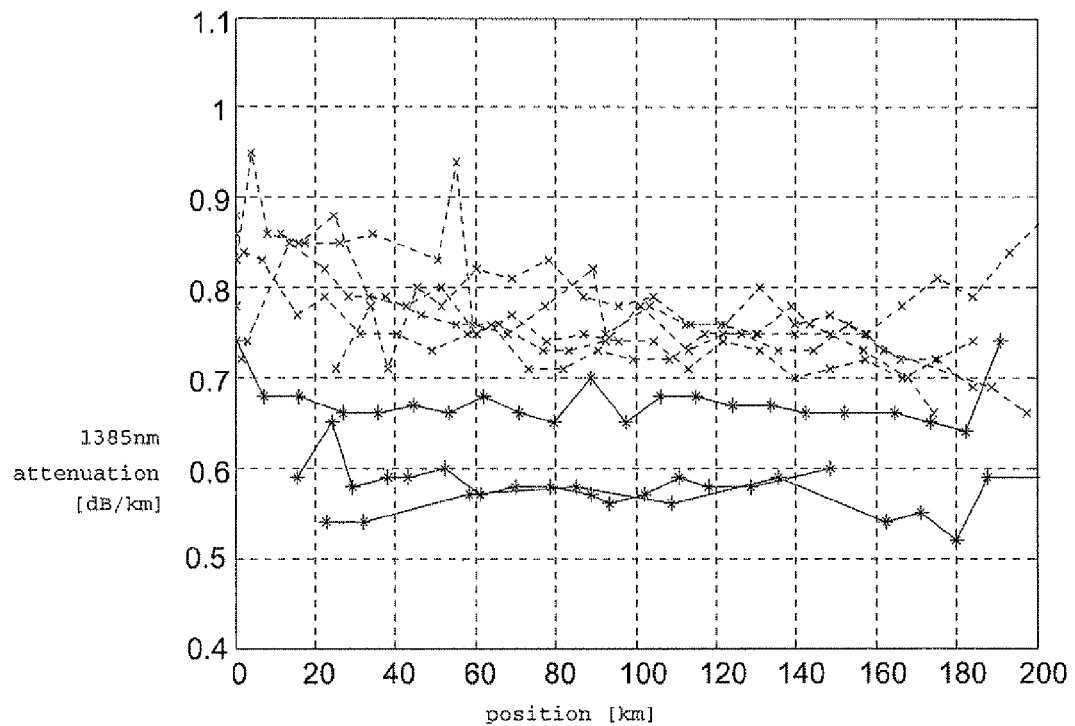
FIG. 3 is a view showing the attenuation at 1385 nm for fibres manufactured according to the prior art and a first example of the present invention.

FIG. 3 is a view showing the attenuation at a wavelength of 1385 nm, measured on fibres according to Comparative Example 1 and Example 1.

The broken lines ( - - - x - - - ) correspond to the measurement results per primary preform for (parts of) optical fibres from the primary preforms manufactured according to Comparative Example 1.

The full lines (—*—) correspond to the measurement results per primary preform for optical fibres from the primary preforms manufactured in accordance with the method according to Example 1.

The vertical axis shows the attenuation coefficient expressed in dB/km.

The horizontal axis shows the position in the drawn optical fibre, expressed in kilometers.

A position "0" in the optical fibre corresponds to the position of the reversal point 6 near the discharge side 4 of the hollow glass substrate tube 2 during the internal vapour deposition process.

Thus it can be clearly discerned in FIG. 3 that the attenuation at 1385 nm of optical fibres manufactured on the basis of primary preforms according to the present invention is lower than that of optical fibres manufactured according to Comparative Example 1. Said lower attenuation was observed over practically the entire length of the drawn optical fibre.

The present inventors conclude from these results that the amount of hydroxyl groups incorporated in the deposited glass during the internal vapour deposition process according to Example 1, i.e. according to the present invention, is lower than the amount of hydroxyl groups incorporated in the primary preform according to Comparative Example 1.

COMPARATIVE EXAMPLE 1

Five primary preforms for gradient index multimode optical fibres were produced, using a prior art PCVD-type internal vapour deposition process. The conditions and process settings were the same as the process settings and conditions used in Comparative Example 1. The difference with Comparative Example 1 lies in the point in time at which the primary preforms were manufactured.

After completion of the internal vapour deposition process, each of the five hollow glass substrate tubes and the glass layers deposited therein (primary preforms) was collapsed into a solid primary preform, using a heat source. Using a preform analyser, the radial refractive index profile was measured at a few positions around the middle, seen in longitudinal direction, of each solid primary preform.

Subsequently, an additional layer of glass was deposited on the solid primary preform, using a plasma overcladding technique, in which natural silica powder was deposited on the exterior of the primary preform and vitrified, using a plasma burner.

Following that, a gradient index multimode optical fibre was drawn from each final preform thus obtained. The fibre thus drawn, which had a total length of about 200 km, was divided into a number of smaller fibre parts, and the attenuation (expressed in the attenuation coefficient) at a wavelength of 1385 nm of each of said parts was determined.

EXAMPLE 2

Two primary preforms for gradient index multimode optical fibres were produced, using the present invention. The conditions and process settings were the same as the settings and conditions used in Comparative Example 2, with this difference that during the manufacture of the three primary preforms according to Example 2 a pulsed additional amount of gas consisting of fluorine-containing compound $C_2F_6$ was added to the main gas flow 8 via the subsidiary gas flow 9 when the reaction zone was located at the reversal point near the supply side. The pulse time was 60 ms and the total amount of additional $C_2F_6$ was 0.06 scc.

After completion of the internal vapour deposition process, each of the two hollow glass substrate tubes and the glass layers deposited therein (primary preforms) was collapsed into a solid primary preform, using a heat source. Using a preform analyser, the radial refractive index profile was measured at a few positions around the middle, seen in longitudinal direction, of each solid primary preform.

Subsequently, an additional layer of glass was deposited on the solid primary preform, using a plasma overcladding technique, in which natural silica powder was deposited on the exterior of the primary preform and vitrified, using a plasma burner.

Subsequently, a gradient index multimode optical fibre was drawn from each final preform thus obtained. The fibre thus drawn, which had a total length of about 200 km, was divided into a number of smaller parts, and the attenuation (expressed in the attenuation coefficient) at a wavelength of 1385 nm of each of said parts was determined.

In order to make it possible to arrive at an adequate comparison of the results of the attenuation measurements at 1385 nm for the fibres from the primary preforms according to Comparative Example 2 and those according to Example 2, two primary preforms according to Comparative Example 2 were first made, then a primary preform according to Example 2, subsequently a preform according to Comparative Example 2, followed by a primary preform according to Example 2, and finally another two primary preforms according to Comparative Example 2.

The present inventors did not observe a difference in the radial refractive index profile between primary preforms manufactured according to Comparative Example 2 and primary preforms manufactured according to Example 2. The present inventors conclude from this that no additional fluorine, or at least a negligible amount thereof, is incorporated in the deposited glass as a dopant when using the present invention according to Example 2.

Figure 4:
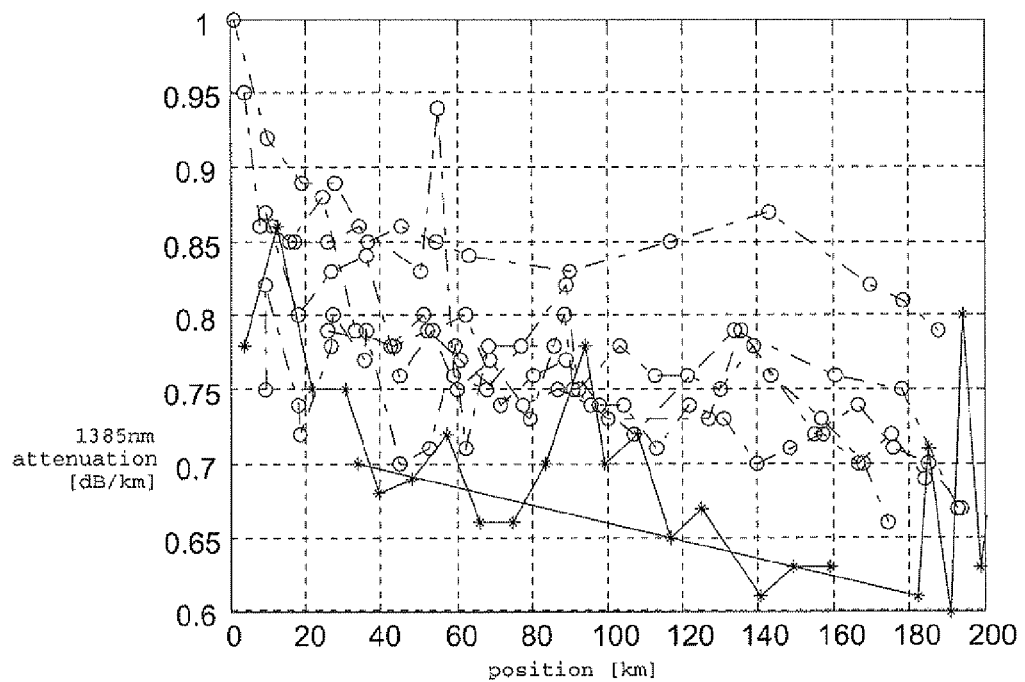
FIG. 4 is a view showing the attenuation at 1385 nm for fibres manufactured according to the prior art and a second example of the present invention.

FIG. 4 is a view showing the attenuation at a wavelength of 1385 nm, measured on fibres according to Comparative Example 2 and Example 2 according to the present invention.

The broken lines ( - - - o - - - ) correspond to the measurement results per primary preform for optical fibres from the primary preforms manufactured according to Comparative Example 2.

The full lines (—*—) correspond to the measurement results per primary preform for optical fibres from the primary preforms manufactured in accordance with the method according to Example 2.

The vertical axis shows the attenuation coefficient expressed in dB/km.

The horizontal axis shows the position in the drawn optical fibre, expressed in kilometers. A position "0" in the optical fibre corresponds to the position of the reversal point 6 near the discharge side 4 of the hollow glass substrate tube 2 during the internal vapour deposition process.

Thus it can be clearly discerned in FIG. 4 that the attenuation at 1385 nm of optical fibres manufactured on the basis of primary preforms according to Example 2 is lower than that of optical fibres manufactured according to Comparative Example 2, according to the prior art. Said lower attenuation was observed over practically the entire length of the drawn optical fibre.

The present inventors conclude from these measurement results that the amount of hydroxyl groups incorporated in the deposited glass during the internal vapour deposition process according to Example 2 is lower than the amount of hydroxyl groups incorporated in the primary preform according to Comparative Example 2.

From Dutch patent published under No. NIL 1033769 it is known that soot deposition takes place during an internal vapour deposition process, which soot deposition shows up as a ring on the interior of the hollow (glass) substrate tube. Said soot rings form near the reversal point 5 on the supply side.

The present inventors have found that, in addition to the effect of the present invention on the incorporation of hydroxyl groups, the formation of such soot rings near the reversal point 5 near the supply side 3 of the hollow glass substrate tube 2 was strongly reduced. Without wishing to be bound by this theory, the present inventors assume that the disappearance of the soot ring near the reversal point 5 on the supply side is caused by the etching effect of fluorine in the presence of the plasma reaction zone.

Although the examples relate to gradient index multimode optical fibres, the present invention is by no means limited to such optical fibres. The present invention can be used with every type of optical fibre that is manufactured by means of an internal vapour deposition process. The present invention is in particular suitable for single-mode fibres, because the 1385 nm wavelength is one of the possible wavelengths at which such a fibre is used in a communication network.

In the embodiment in which a primary preform for optical fibres is manufactured in which the optical fibre exhibits a radial refractive index profile comprising several concentric layers (also referred to as "shells"), which may or may not have different refractive index values, the present invention can be applied to one or more of the corresponding concentric layers in the primary preform during the internal vapour deposition process.

The invention claimed is:

1. A method for manufacturing a primary preform for optical fibres using an internal vapour deposition process, comprising the steps of:
   i) providing a hollow glass substrate tube having a supply side and a discharge side,
   ii) surrounding at least part of the hollow glass substrate tube by a furnace,
   iii) supplying a constant gas flow, doped or undoped, of glass-forming gases to the interior of the hollow glass substrate tube via the supply side thereof,
   iv) creating a reaction zone with conditions such that deposition of glass will take place on the interior of the hollow glass tube, and
   v) moving the reaction zone back and forth in a longitudinal direction over the hollow glass substrate tube between a reversal point located near the supply side and a reversal point located near the discharge side of the hollow glass substrate tube, wherein
   during at least part of step v) a pulsed additional amount of a gas comprising a fluorine-containing compound is supplied in addition to the constant gas flow to the interior of the hollow glass substrate tube via the supply side thereof when the reaction zone is located near or at a reversal point.

2. A method according to claim 1, wherein the fluorine-containing compound is free of hydrogen atoms and is selected from the group consisting of the compounds $CF_4$, $C_2F_6$, $C_4F_8$, $CCl_2F_2$, $SiF_4$, $Si_2F_6$, $SF_6$, $NF_3$, $F_2$ or a mixture of two or more of these compounds.

3. A method according to claim 2, wherein the fluorine-containing compound is $C_2F_6$, $C_4F_8$ or a mixture thereof.

4. A method according to claim 1, in which the extent of the gas flow supplied in step iii) is constant when moving the reaction zone back and forth in longitudinal direction over the hollow glass substrate tube between a reversal point located near the supply side and a reversal point located near the discharge side of the hollow glass substrate tube.

5. A method according to claim 1, wherein said additional amount of gas is supplied in the form of one or more pulses, wherein a pulse time of 10-500 ms is used.

6. A method according to claim 1, wherein the total amount of fluorine-containing compound in the additional amount of supplied gas is 0.01-10 sec.

7. A method according to claim 1, wherein the additional amount of gas comprises a carrier gas and/or dopants and/or glass-forming gases.

8. A method according to claim 1, wherein the additional amount of gas comprises oxygen as the carrier gas.

9. A method according to claim 1, wherein the reaction zone moves at a speed of 10-40 m/min along the deposition length of the hollow glass substrate tube in step v).

10. A method according to claim 1, wherein the reaction zone in step iv) is a plasma in which the plasma power during step v) is constant.

11. A method according to claim 1, wherein the furnace is set at a temperature of 800-1200° C. in step v).

12. A method according to claim 1, wherein the additional amount of gas is added only when the reaction zone is located at or near the reversal point near the supply side of the hollow glass substrate tube.

13. A method according to claim 1, wherein the additional amount of gas is added only when the reaction zone is located at or near the reversal point near the discharge side of the hollow glass substrate tube.

14. A method for manufacturing a final preform for optical fibres, comprising the steps of:
   i) manufacturing a primary preform according to claim 1 and then
   ii) collapsing the primary preform obtained in step i) into a solid primary preform, using a heat source,
   iii) optionally depositing an additional amount of glass on the exterior of the solid primary preform so as to form a final preform.

15. A method for manufacturing an optical fibre, comprising the manufacturing of a final preform for optical fibres according to claim 14, followed by the steps of heating one end of the final preform and drawing an optical fibre.

\* \* \* \* \*